United States Patent [19]

Johnson et al.

[11] 4,117,027

[45] Sep. 26, 1978

[54] THERMALLY STABLE HOT-MELT ADHESIVE COMPOSITION CONTAINING POLYCARBONATE-POLYDIMETHYL-SILOXANE BLOCK COPOLYMER

[75] Inventors: Edward F. Johnson, Sunnyvale; John S. Carlsen, Davis, both of Calif.

[73] Assignee: Raychem Corporation, Menlo Park, Calif.

[21] Appl. No.: 677,528

[22] Filed: Apr. 16, 1976

Related U.S. Application Data

[63] Continuation-in-part of Ser. No. 560,615, Mar. 21, 1975, abandoned.

[51] Int. Cl.$^2$ .................... C08L 43/04; C08L 83/06; C08L 83/10
[52] U.S. Cl. ................. 260/824 R; 260/827; 428/447
[58] Field of Search ................. 260/824, 827

[56] References Cited

U.S. PATENT DOCUMENTS

| | | | |
|---|---|---|---|
| 3,379,970 | 4/1968 | Krauss et al. | 260/824 R |
| 3,419,634 | 12/1968 | Vaughn | 260/824 R |
| 3,419,635 | 12/1968 | Vaughn | 260/824 R |
| 3,644,245 | 2/1972 | Flanagan | 260/824 R |
| 3,679,774 | 7/1972 | LeGrand | 260/824 R |
| 3,803,079 | 4/1974 | Hokama | 260/33.6 UA |
| 3,821,325 | 6/1974 | Merritt et al. | 260/824 R |
| 3,832,419 | 8/1974 | Merritt | 260/824 R |

OTHER PUBLICATIONS

Ojima, N., et al. "Hot-Melt Adhesive Composition" Feb. 1964, Japan 74 07,571; C.A. 83 60508t.

*Primary Examiner*—Howard E. Schain
*Attorney, Agent, or Firm*—Lyon & Lyon

[57] ABSTRACT

An adhesive composition is disclosed comprising a silicon block copolymer and a tackifier. The adhesive is capable of forming an unexpectedly strong bond with substrates having low surface energy without having to etch the surface of the substrate. Furthermore, the adhesive has good thermooxidative and electrical properties which latter properties are unaffected by water.

10 Claims, No Drawings

THERMALLY STABLE HOT-MELT ADHESIVE COMPOSITION CONTAINING POLYCARBONATE-POLYDIMETHYLSILOXANE BLOCK COPOLYMER

The present application is a continuation-in-part of an earlier filed application, Ser. No. 560,615, filed Mar. 21, 1975 abandoned July 8, 1976, the disclosure of which is incorporated herein by reference.

BACKGROUND OF THE INVENTION

The present invention relates to a hot-melt adhesive, and, in particular, to a hot melt adhesive capable of forming a secure bond to substrates having low surface energies.

Prior hot-melt adhesives have been found to be satisfactory in most applications. A hot-melt adhesive must possess several properties to be capable of use as a bonding agent. First, a hot-melt adhesive must be capable of maintaining a strong bond at the desired operating temperatures and in hostile environments. The adhesive should be non-tacky at room temperature so that it can be readily applied in the desired application. Lastly, the adhesive must be fluid enough at its application temperature to wet the surface of the substrate to be adhered to. This is essential for the formation of a secure bond to said substrate. The ability to wet the surface of the substrate is determined by the surface tension of the liquid. The adhesive must have a lower critical surface tension or surface energy than the surface energy of the substrate to enable wetting of the substrate. Most prior art adhesives are therefore unable to form a bond with substrates having low surface energies. Prior art methods of bonding to substrates with an inherently low surface energy thus involve either chemically or electrically etching the surface of the substrate to increase its surface energy, and where the low surface energy is due to contaminants sandblasting the substrate surface to achieve the same effect by removal of said low surface energy contaminants.

One of the few prior art hot-melt adhesives capable of bonding to substrates having a low surface energy is made by Du Pont and marketed under the name of "Hytrel". Hytrel is a block copolymer derived from terephthalic acid, polytetramethylene ether glycol and 1,4-butanediol. Unfortunately, Hytrel requires relatively extensive preparation of the substrate surface in order to obtain a strong bond and furthermore, is thermooxidatively and hydrolytically less stable than is necessary in certain applications. Furthermore, Hytrel has poor electrical properties from the standpoint of resistivity, dielectric strength and dissipation factor which prevents its use in many electrical applications (e.g. under high humidity conditions).

SUMMARY OF THE INVENTION

It is an object of the present invention to provide a hot-melt adhesive which has good electrical, thermooxidative and hydrophobic properties and also is capable of forming a strong bond with substrates having an extremely low surface energy without the necessity of resorting to etching.

These and other objects and advantages are obtained by forming an adhesive composition comprising a silicon block copolymer and a tackifier. The adhesive composition can effectively wet the surface of untreated substrates having extremely low surface energies such as Kynar, Stilan, Kapton, and Ryton polymers. Moreover, the tackifier functions to increase the interactions between the substrate and the adhesive to thereby increase the adhesive bond strength between substrates. The resultant bond is thermooxidatively stable and does not deteriorate at higher temperatures. Filters, oxidative, thermal or U.V. stabilizers, curing agents, pigments, plasticizers, flame retardants, adhesive promoters, and the like may also conveniently be added.

DETAILED DESCRIPTION OF THE INVENTION

The adhesive of the present invention comprises a silicon block copolymer and a tackifier. The adhesive is capable of forming a strong bond to unetched substrates having low inherent surface energies or low surface energies due to the presence of surface impurities. Furthermore, the resultant bond is hydrolytically and thermooxidatively stable and does not deteriorate even after long periods at elevated temperatures. Bonds containing the adhesive of the instant invention also possess an unusually large insulation resistance at both ambient and elevated temperatures thereby enabling its use in unusually demanding electrical applications. Furthermore, the adhesive of the present invention does not absorb or readily react with water and therefore, has unusually high insulation resistance even in high humidity and temperature environments.

The silicon block copolymer component of the present adhesive is preferably a siloxane block copolymer such as a polyester-poly-(dimethyl siloxane) preferably the polycarbonate polydimethylsiloxane which have the following formula:

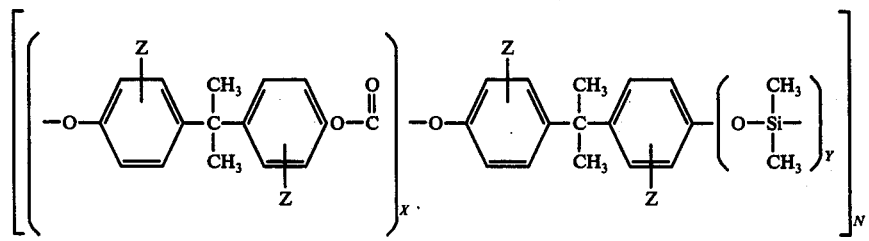

where z can be independently hydrogen, $C_1$ to $C_8$ alkyl, or halogen, especially chlorine or bromine positioned on the ring, where X is equal to from 1 to about 100, inclusive, Y is equal to from about 5 to 200, inclusive, and preferably Y has an average value from about 15 to about 90, inclusive, while the ratio of X to Y can vary from about 0.05 to about 1.5, inclusive, and where Y has an average value of from about 15 to about 90, inclusive, the ratio of X to Y is preferably from 0.10 to about 0.25, inclusive.

In a preferred embodiment, the polymer contains by weight approximately 20 to 80% of polyester units and correspondingly approximately 80 to 20% poly (dimethylsiloxane) units. The polymer preferably contains 35 to 65% of the polyester units and correspondingly 65 to 35% of the siloxane units. The polymer preferably a value for N of about 1 to about 1000 and has a number average molecular weight of approximately 10,000 to 100,000, preferably 15,000 to 40,000. It will, however, be apparent to one skilled in the art, in light of this disclosure, that other proportions of the polyester and siloxane blocks may be appropriately utilized and that other silicone block copolymers may suitably be utilized.

In an alternative embodiment, the copolymer may be admixed with 100% polyester resin (e.g. polycarbonate) to form a homogeneous mixture having an increased percentage of polyester units. The mixture preferably contains overall by weight approximately 20 to 80% of polyester units wherein a portion of the polyester units are in the resin and the remaining portion are in the copolymer. The increase in the percentage of polyester units functions to make the material stiffer thereby facilitating handling of the material during processing.

The silicone block copolymers of the present invention are not in and of themselves significantly superior to many other prior art adhesives, and indeed have little or no utility as adhesives. It is only when they are combined with certain particular types of tackifiers as hereinafter enumerated that an outstandingly effective hot-melt adhesive results. While we do not wish to be bound by any particular mechanistic interpretation, the tackifier is believed to function to decrease the surface tension of the copolymer, thereby enabling the adhesive to more effectively wet the surface of the substrate. However, a particularly unexpected aspect of the present invention is that only a very limited class of tackifiers have this effect. Most known prior art tackifiers are essentially useless. The tackifier is preferably at least partially soluble in the polysilicon block copolymer, at least to the extent that segregation at interfaces is minimized. We believe that it is advantageous for the tackifier to have a permanent dipole or be capable of a high degree of polarizability. Thus, for example, we find that the tackifiers with easily polarized carbon-halogen bonds or aromatic unsaturation are effective in increasing the bond strength of the adhesive composition, while the less easily polarizable highly aliphatic tackifiers do not increase the overall bond strength. We prefer that the tackifier should also be heat stable at elevated temperatures so that it will not decompose or otherwise react harmfully with the copolymer. This precludes the use of acidic tackifiers which degrade the copolymer at bonding temperatures. Because very few tackifiers are capable of filling these requirements, it is preferred that the tackifier be one of the following:

1. a copolymer of vinyl toluene and α-methyl styrene;
2. hexabromobiphenyl;
3. pentabromodiphenylether; or
4. chlorinated terphenyls.

The preferred tackifiers should have a molecular weight range of between 500 and 2000 and the melt viscosity of the tackifier should be below 1 poise at 165° C. It will, however, be apparent to one skilled in the art, in light of the foregoing disclosure, that other tackifiers having the above-enumerated requisite properties may also be utilized. In some instances it may be preferable to use mixtures of block copolymers of varying polysiloxane content blended with the preferred tackifiers of the instant invention, so as for example to increase the cohesive strength or the tacking temperature of the adhesive composition.

Preferably, to form a blend according to the instant invention, the tackifier is mixed with the copolymer or the mixture of the copolymer and the polyester resin in a weight ratio of approximately 1 to 50 to 1 to 2 tackifier to copolymer, or tackifier to mixture, preferably 1 to 10 to 1 to 4. The resultant blend is substantially non-tacky at room temperature and can be readily bonded to the surface of the substrate merely by heating it in contact with the substrate to a temperature ranging from at least about 270° C. to about 350° C. preferably approximately 290° C. to 340° C. for a short period of time, such as approximately 30 to 40 seconds although shorter or longer times may appropriately be used advantageously. The resultant bond possesses significantly greater bonding strength to untreated substrates having inherently low surface energy than do bonds formed of other prior adhesives. Similarly effective bonds are formed with uncleaned substrates having surfaces contaminated with low surface energy impurities. As can be seen from Table 1, the present adhesive forms stronger bonds with unetched substrates having extremely low surface energy such as the poly (phenylene sulfide) polymer marketed by Philips Petroleum Corporation under the trademark of "Ryton", the poly(vinylidene fluoride) polymer marketed by Pennwalt Corporation under the trademark "Kynar", the polyarylene polymer marketed by Raychem Corporation under the trademark "Stylan", and the polyimide polymer marketed by Du Pont Corporation under the trademark "Kapton".

The invention can be further considered in the light of the following illustrative examples.

EXAMPLE I

Silicon poly carbonate block copolymers having the molecular weight's as shown in Table I and supplied by the General Electric Corporation were blended with the tackifiers shown in the table by solution blending in methylene chloride and solvent cast in films approximately 10 mils in thickness. These films were used to adhere together the various polymers indicated using slight applied pressure at a temperature of 320° C. for 30 seconds. The results obtained initially and after oven aging at 150° C. for 100 hours are shown in the table below.

EXAMPLE II (Sample 3G of Table I)

A silicon polycarbonate block copolymer, having the molecular weight shown, containing 50% siloxane can be blended with a silicone polycarbonate block copolymer containing 65% siloxane and tackifier as discussed above to obtain an adhesive composition with greater cohesive strength and having a higher tacking temperature without unduly decreasing the resulting adhesive bond strength. This change affords a more easily handled adhesive composition.

EXAMPLE III

A silicon polycarbonate block copolymer containing 50% siloxane can be blended with up to 25% of the polycarbonate homopolymer and tackifier as discussed above to obtain an adhesive composition with greater stiffness but resulting in a decreased adhesive bond strength. However, this change results in an adhesive composition which can be molded into thin walled tubing and handled with high speed mechanical processing equipment.

TABLE I

| No. | Silicon Polycarbonate Block Copolymer | % Siloxane | Molecular Weight No. Avg. | Molecular Weight Wt. Avg. | Tackifier (20% by Weight) | 148/97 T-Peel Strength (pounds/linear in.) Kynar-Stilan | Kynar-Stilan after 100 Hrs. at 150° C | Stilan-Stilan | Ryton-Stilan | Kapton-Stilan |
|---|---|---|---|---|---|---|---|---|---|---|
| 1A* | XD-1 | 65% | 29,000 | 238,000 | | 1.3 | | 1.5 | | |
| 1B | LR5630,blend #1 | 65% | 21,000 | 161,000 | | 2.2 | | 8.0 | | 2.8 |
| 1C | Batch 1081-45B | 65% | 19,500 | 126,000 | | 4.5 | | 5.6 | | |
| 1D | XD-7 | 50% | 21,000 | 113,000 | | 0 | | 0.2 | | |
| 1E | Blend of 15% XD-7 = 85% LR5630,blend#1 | 62% | 21,000 | 154,000 | | 1.9 | | | | |
| 2A | LR5630,blend#1 | 65% | 21,000 | 161,000 | Copolymer of vinyl toluene & methyl styrene (melt viscosity <1.0 Poise at 165° C) | 2.1 | | 7.3 | 2.0 | |
| 2B | LR5630,blend#1 | 65% | 21,000 | 161,000 | ester of polymerized abietic acid | 2.0 | | 5.1 | | |
| 3A | XD-1 | 65% | 29,000 | 238,000 | Copolymer of vinyl toluene & methyl styrene (melt viscosity <1.0 poise at 165° C) | 3.8 | | 3.6 | | |
| 3B | LR5630,blend#1 | 65% | 21,000 | 161,000 | | 9.0 | 11.5 | 17.8 | 15.5 | 8.9 |
| 3C | | | | | hexabromobiphenyl | 9.9 | 11.7 | 15.9 | | |
| 3D | | | | | pentabromodiphenyl ether | 8.8 | 12.0 | 12.2 | | |
| 3E | | | | | chlorinated terphenyl | 9.3 | 16.1 | 19.7 | | 11.0 |
| 3F | Batch 1081-45B | 65% | 19,500 | 126,000 | Same as 3A & B | 9.8 | | 14.8 | | |
| 3G | Blend of 15% XD-7 & 85% LR5630,blend#1 | 62% | 21,000 | 154,000 | pentabromobiphenyl ether | 6.2 | 14.6 | | | |

*1A through 1E, 2A and 2B are not in accordance with the teaching of this invention Table I shows that the silicon polycarbonate block copolymers are not effective as adhesives without the preferred tackifiers. When one of the preferred tackifiers is blended with any of the silicon-polycarbonates, the resulting adhesive composition forms a much stronger bond with any of the substrates tested than did the silicon poly carbonate resin by itself. Not only does the addition of preferred tackifier increase the adhesive bond strength, it also changes the mode of failure from adhesive failure to cohesive failure in most cases. The latter is the preferred method of failure. Prior art adhesives (i.e., Hytrel) do not undergo cohesive failure under any conditions.

While only certain embodiments and applications of this invention have been shown and described, it will be apparent to those skilled in the art that many more modifications are possible without departing from the inventive concepts herein described. The invention, therefore, is to be limited only by the lawful scope of the Claims which follow.

What is claimed is:

1. A thermally stable hot melt adhesive for bonding to substrates having low surface energies comprising a silicone block copolymer and a tackifier, said copolymer comprising polycarbonate and polysiloxane blocks and said tackifier selected from the group consisting of
   a copolymer of vinyl toluene α-methyl styrene; hexabromobiphenyl; pentabromodiphenylether; and chlorinated terphenyls.

2. A thermally stable hot melt adhesive for bonding to substrates having low surface energies comprising polycarbonate, a silicone block copolymer and a tackifier said copolymer comprising polycarbonate and polysiloxane blocks and said tackifier selected from the group consisting of
   a copolymer of vinyl toluene α-methyl styrene; hexabromobiphenyl; pentabromodiphenylether; and chlorinated terphenyls.

3. The adhesive of claim 1 wherein said polysiloxane is polydimethylsiloxane.

4. The adhesive of claim 1 wherein said copolymer consists of approximately 80 to 20% of said polycarbonate and approximately 20 to 80% of said polysiloxane.

5. The adhesive of claim 1 wherein said copolymer has a number average molecular weight of approximately 15,000 to 40,000.

6. The adhesive of claim 1 wherein said adhesive is comprised of by weight about 80% of said copolymer and 20% of said tackifier.

7. A thermally stable hot-melt adhesive for bonding substrates having low surface energies comprised of polycarbonate, polydimethylsiloxane block copolymer and a copolymer of vinyl toluene and methyl styrene.

8. A thermally stable hot-melt adhesive for bonding substrates having low surface energies comprised of polycarbonate, polydimethylsiloxane block copolymer and hexabromobiphenyl.

9. A thermally stable hot-melt adhesive for bonding substrates having low surface energies comprised of polycarbonate, polydimethylsiloxane block copolymer and pentabromodiphenylether.

10. The adhesive of claim 2 wherein the mixture of polycarbonate resin and silicone block copolymer comprises approximately 20 to 80% of polycarbonate units by weight and approximately 80 to 20% of polysiloxane units by weight.

* * * * *